June 7, 1960 L. S. SUOZZO 2,939,663
CONSTANT SUPPORT DEVICE
Filed March 28, 1956 5 Sheets-Sheet 1

INVENTOR
LEONARD S. SUOZZO
F. J. Pisarra
ATTORNEY

June 7, 1960  L. S. SUOZZO  2,939,663
CONSTANT SUPPORT DEVICE
Filed March 28, 1956  5 Sheets-Sheet 2
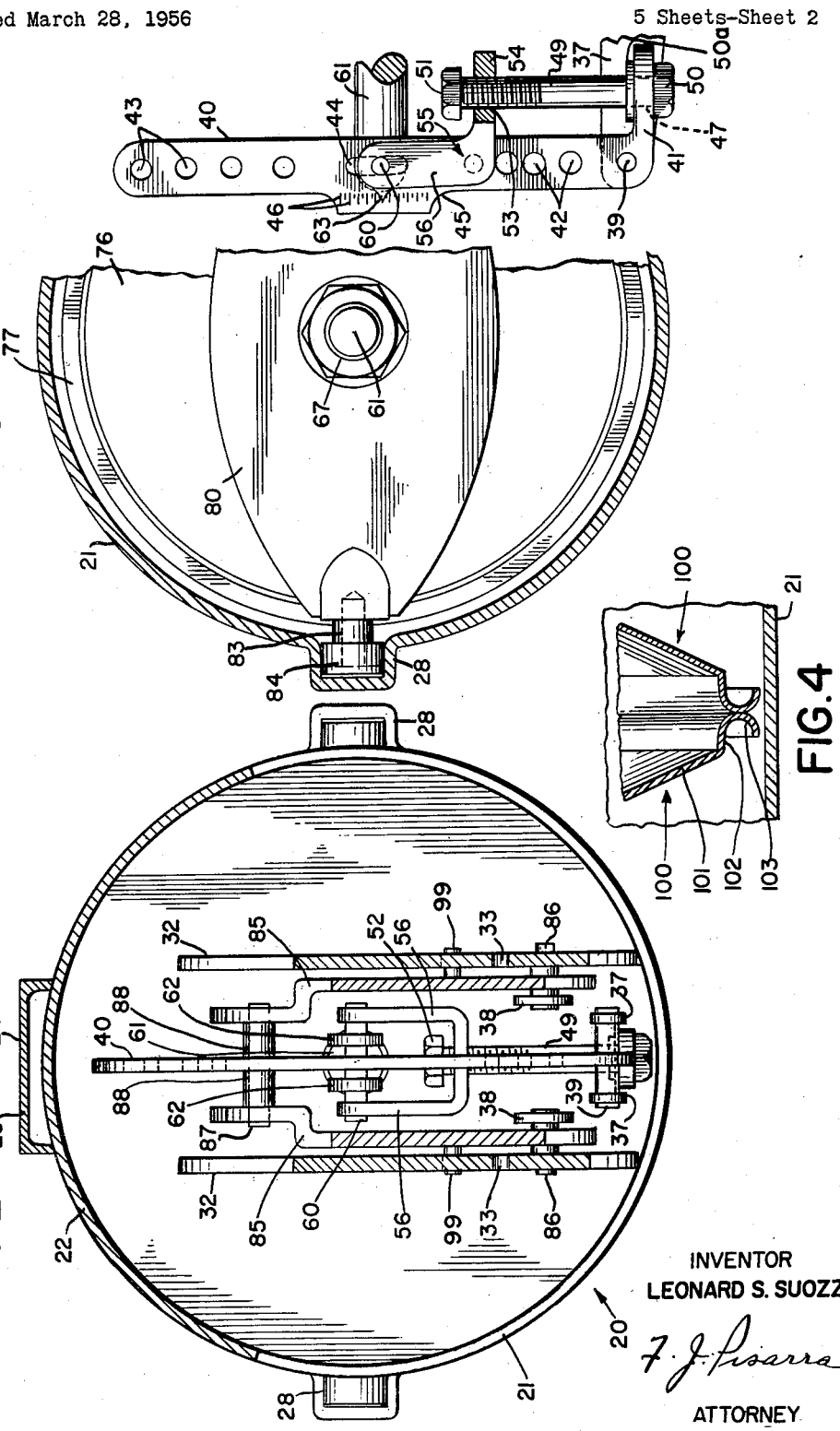
INVENTOR
LEONARD S. SUOZZO
F. J. Pisarra
ATTORNEY June 7, 1960

L. S. SUOZZO 2,939,663

CONSTANT SUPPORT DEVICE

Filed March 28, 1956

INVENTOR
LEONARD S. SUOZZO

ATTORNEY

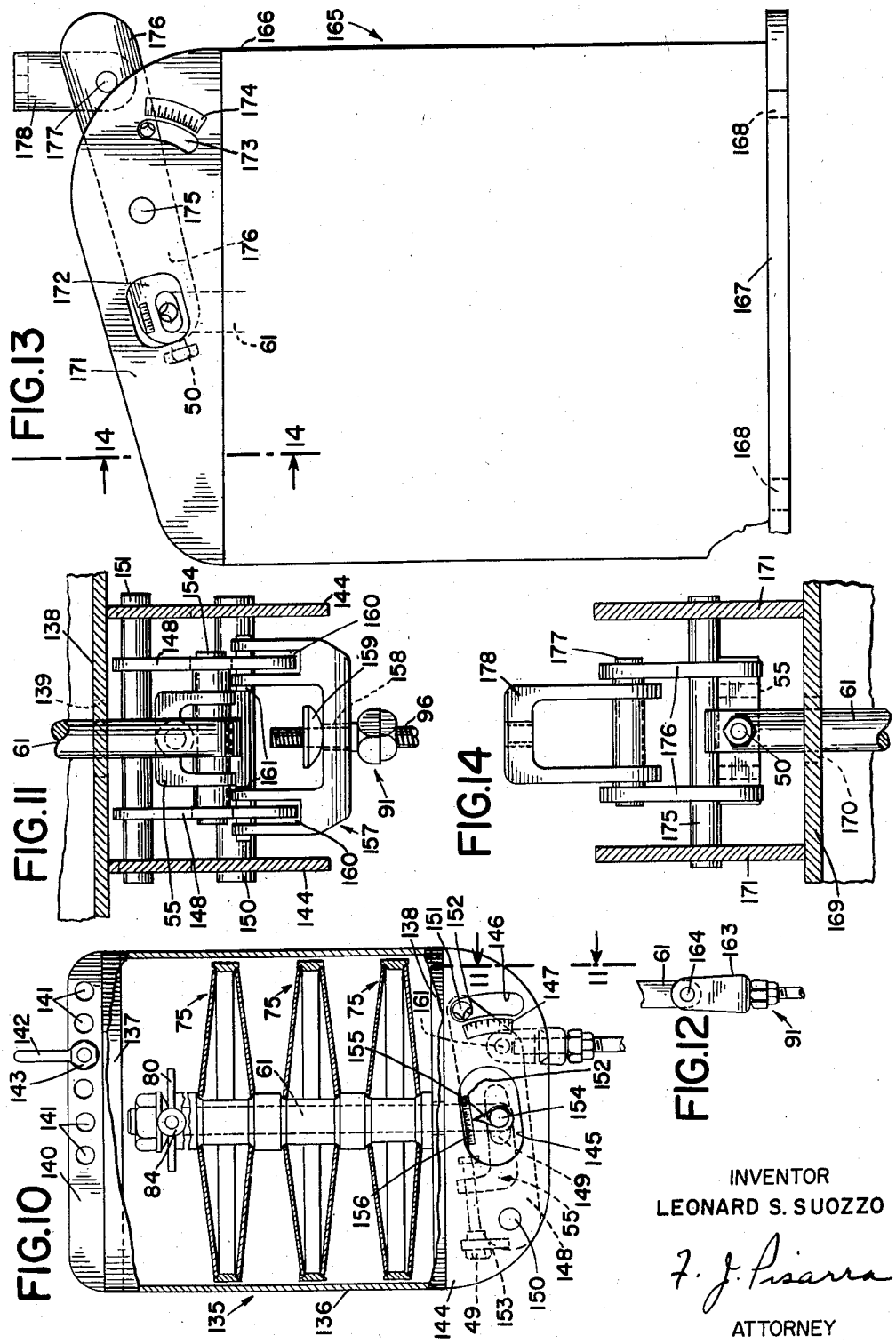

UNITED STATES PATENT OFFICE 2,939,663
Patented June 7, 1960

2,939,663

CONSTANT SUPPORT DEVICE

Leonard S. Suozzo, Hackensack, N.J., assignor to Bergen Pipesupport Corp., New York, N.Y., a corporation of New York Filed Mar. 28, 1956, Ser. No. 574,534

15 Claims. (Cl. 248—54)

This invention relates to the art of spring supports for various types of loads, including pipes and the like, that move vertically. The invention pertains, in one of its more specific aspects, to an improved and unique spring-loaded support device that is adapted to subject a load to a substantially constant supporting force and simultaneously permit vertical movement of the load.

The present invention may be advantageously used in various locations. It is especially useful in power plants and other places for supporting pipe arrangements while permitting movement of the pipes as a result of expansion or contraction thereof, due to temperature changes in the material of the pipes.

There has been considerable activity in the art of spring support devices during the past twenty-five years. That activity has brought forth a number of developments in variable support devices and in constant support devices employing spring means. To the best of my knowledge and belief, such devices have all employed helical springs that are stressed in compression or tension during use. Helical springs are inherently incapable, per se, of subjecting a load to a constant supporting force and at the same time contracting or expanding in respone to movement of the load. For this reason, it has been necessary, when employing such springs in constant support devices, to furnish mechanisms of varying complexity that coact with the load-carrying helical springs to more or less compensate for variations in the force exerted by the springs due to load movements.

The outstanding feature of this invention is the utilization of one or more disc springs of the general type commonly referred to as the "Belleville spring" as the load-carrying spring means of a constant support device. I have discovered that disc springs may be advantageously employed in lieu of helical springs that have been extensively employed heretofore in various spring supports including variable support devices and constant support devices.

A disc spring has the important characteristic of exerting a substantially constant force or load for an appreciable portion of its deflection range. This is indicated in the spring force diagram and the graph, respectively appearing in Figs. 9 and 15 of the annexed drawings. The spring loading along the substantially flat portion of the diagram and graph, which represent the deflection range of substantially constant force, may be calculated from the following formula:

$$P = \frac{132,000,000 \, ht^3}{MD^2}$$

wherein, $d$ = the inside diameter of the disc spring
$P$ = the load at flat portion
$M$ = the constant from chart based on $D/d$
$D$ = the outside diameter of the disc spring
$t$ = the thickness of the disc spring
$h$ = the set or dish (deflection to flat) and, wherein $$\frac{h}{t} = 1.46$$

$h = 1.46t$ $$P = \frac{132,000,000 \, (1.46t^4)}{MD^2} \text{ (for deflection 1.46}t \text{ to flat position)}$$

The stress may be calculated from the following formula:

$S$ = the stress when the disc spring is flat (use 160,000 maximum)

$$S = \frac{132,000,000 \, (1.46t)}{MD^2} \times (.73tC_1 - tC_2)$$

$$S = \frac{132,000,000 \, (1.46t^2)}{MD^2} \times (.73tC_1 - C_2)$$

wherein, $C_1$ = constant from chart based on $D/d$
$C_2$ = constant from chart based on $D/d$
$M$ = constant from chart based on $D/d$ I have found that by precompressing the disc spring to the point of commencement of its substantially constant force and utilizing the corresponding range of deflection thereof, the spring serves as a splendid means for constantly supporting a load that is vertically movable within the constant force deflecting range of the spring. Furthermore, by using a plurality of disc springs, corresponding load travels are permissible. When a plurality of disc springs is used, a means is provided in my device for allowing necessary deflection of the individual springs to accomplish the objectives of this invention. Moreover, such means and associated parts are so constructed and arranged as to allow normal load travel corresponding to the permissible cumulative deflection of the springs. The means and parts here referred to will be described in the detailed description that follows.

Another feature of the invention resides in constructing and arranging the parts of the device in a manner to obtain a compact structure. As a consequence, the device, when used to suspend a load, requires less headroom than similar devices which are presently available. Headroom, e.g., vertical space, is oftentimes so restricted in steam power plants and other locales, that it is extremely difficult, and at times impossible, to adequately support piping at a reasonable cost by means of conventional spring supports. This is occasioned by the fact that the dimensions of conventional spring supports are such as to require substantial headroom to permit proper installation and operation. My device overcomes many of the difficulties experienced heretofore. Its design and physical dimensions permit ready assembly, preloading, installation and entirely satisfactory operation in locations where headroom is at a premium.

The invention has for a principal object the provision of a constant support device having improved features of design and construction.

Another object of the invention is to provide a support device for pipes and the like, which device has incorporated therein a spring means comprising at least one disc spring that is adapted to be compressed and exert a supporting force that is substantially constant within a selected range of deflection thereof.

Another object of the invention is to provide a spring hanger that is adapted to be readily assembled and pre-compressed and then installed and used in locations where vertical space is restricted.

Another object of the invention is to provide a device of the character indicated that is adapted to be readily altered and/or adjusted so as to provide various load-travel combinations of parts thereby reducing the number and sizes of springs required in a particular assembly.

Another object of the invention is to provide a constant support device including means to permit of ready adjustment before or after installation, means for indicating the extent of load travel and visible from a point remote from the device, and means for limiting load travel.

Another object of the invention is to provide a spring disc constant support device that is compact in design and sturdy in construction; that is reasonable in manufacturing cost and that is adapted to be readily assembled, adjusted and mounted in position for active use.

A still further object of the invention is to provide a constant support device for pipes or the like that is adapted to perform its intended functions in an efficient and trouble-free manner.

The enumerated objects and additional objects, together with the advantages obtainable by the use of the apparatus of this invention will be understood by persons skilled in the art upon reference to the following detailed description taken in conjunction with the annexed drawings which respectively describe and illustrate several forms of apparatus embodying the invention.

In the drawings:

Fig. 2 is a view taken along line 2—2 of Fig. 1;

Fig. 3 is a view taken along line 3—3 of Fig. 1;

Fig. 4 is a fragmentary view corresponding to Fig. 1a and illustrating a modification of the invention;

Fig. 5 is a side elevation view in enlargement of certain parts shown in Figs. 1 and 2;

Figures 1, 1A:
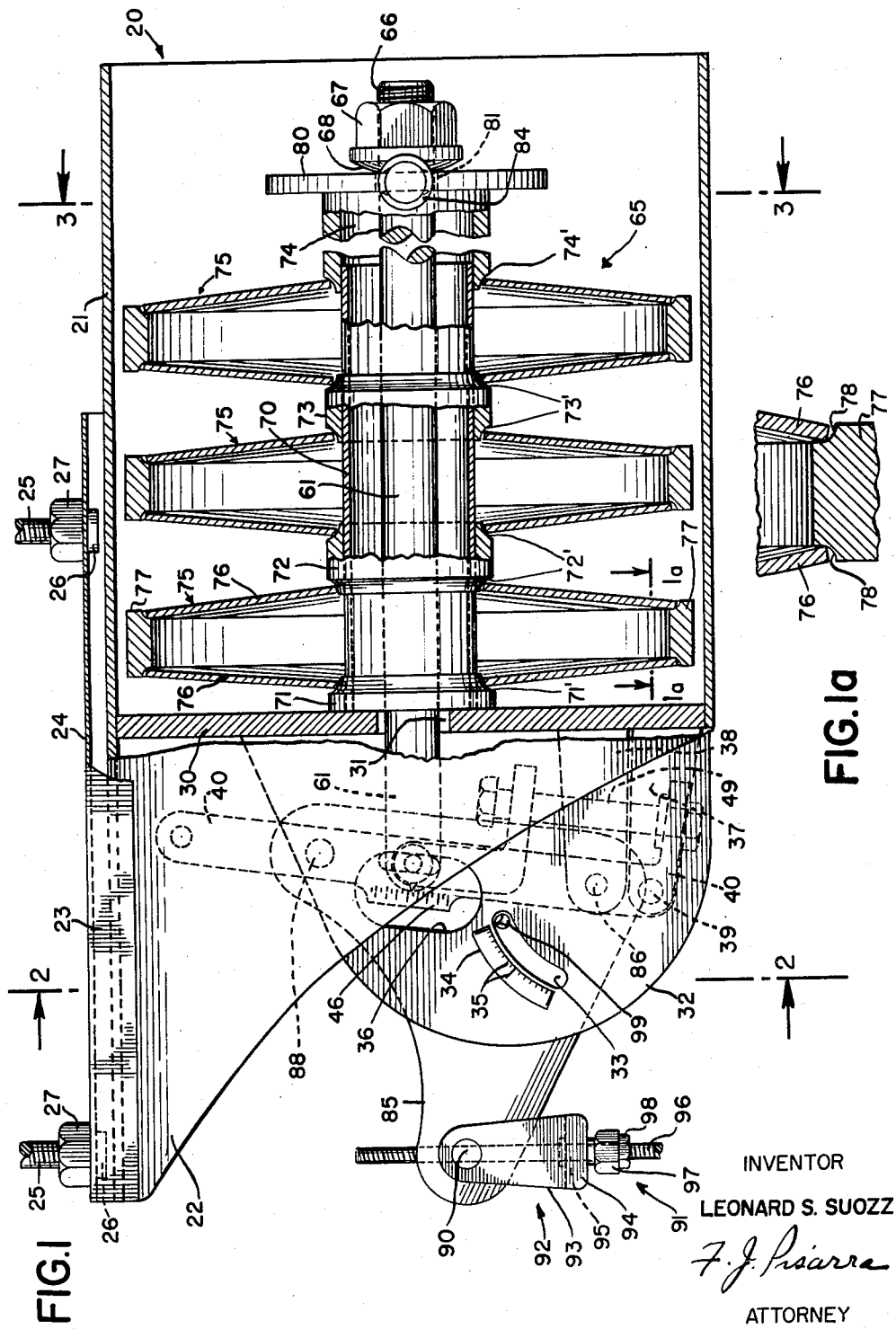
Fig. 1 is a view in side elevation of a spring support device constructed in accordance with the invention, certain parts being shown in vertical cross section and certain other parts being broken away for better illustration of other parts.
Fig. 1a is an enlarged fragmentary view of a portion of Fig. 1.

Fig. 6 corresponds to Fig. 1 and illustrates a modified form of the invention;

Fig. 7 is a view taken along line 7—7 of Fig. 6;

Fig. 8 is a view in longitudinal cross section through a spring unit that is also shown in other views;

Fig. 9 is a spring force diagram derived from the permissible deflection of the spring discs shown in Fig. 8;

Fig. 10 corresponds to Fig. 1 and illustrates another modification of the invention;

Fig. 11 is a view in enlargement taken along line 11—11 of Fig. 10;

Fig. 12 illustrates a modification of the device shown in Figs. 10 and 11;

Fig. 13 is a view in side elevation of still another modification of the invention;

Fig. 14 is a view in enlargement taken along line 14—14 of Fig. 13; and

Figure 15:
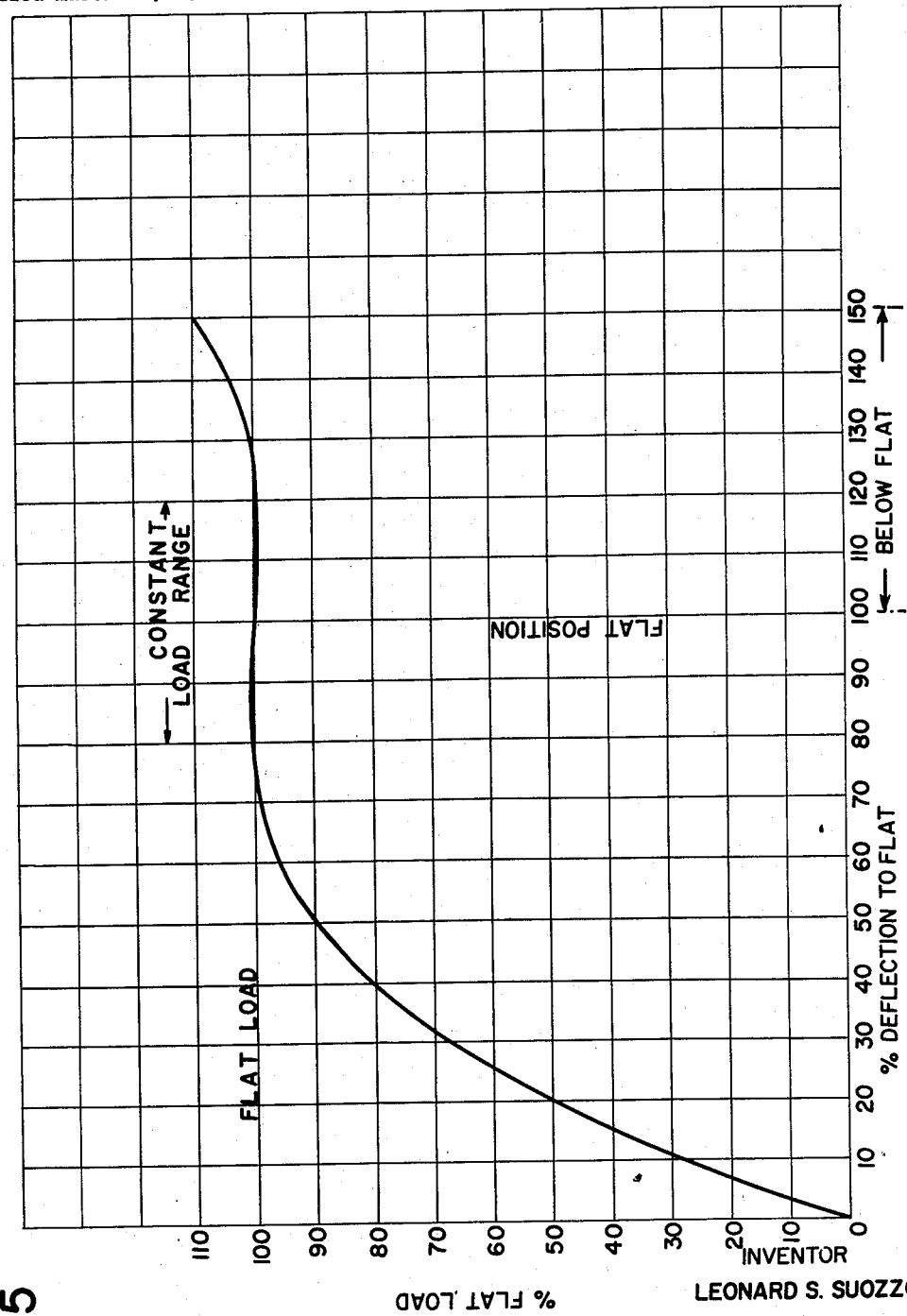

Fig. 15 is a graph representing the load-deflection characteristics of a disc spring used with the various illustrated forms of the invention.

Referring now to the drawings, wherein like reference numerals identify corresponding parts throughout the several views, a housing, generally indicated by numeral 20, includes a tubular wall 21 that is generally circular in transverse cross section. Tubular wall 21 is cut away at its forward end to obtain an arcuate extension 22 that serves as a protective hood for parts positioned therebelow. A channel member 23 is affixed to the top of tubular wall 21, preferably by welding, and includes a web 24. The channel member carries a series of spaced connectors such as bolts 25 that extend through the web and that are provided with heads 26 and nuts 27. The bolts are adapted to be connected to an overhead beam or other supporting structure whereby to suspend the housing and the parts carried thereby.

The rear portion of tubular wall 21 is formed with a pair of diametrically opposed channel-shaped lateral extensions 28 which serve as guides, as will be explained further along herein. The tubular wall carries an end wall 30 having a central through aperture 31. Welded to wall 30 is a pair of parallel plates 32 having aligned arcuate slots 33. A scale 34 is located adjacent each arcuate slot 33 and is provided with suitable graduations, as indicated at 35. Either or both plates 32 is provided with a window 36 that affords access to parts between the plates. Also welded to and projecting forwardly of end wall 30 is a first pair of spaced parallel arms 37 and a second pair of spaced parallel arms 38. A horizontal shaft 39 is journaled in arms 37.

A lever 40 has its lower portion positioned between arms 37 and is mounted for pivotal movement about the axis of shaft 39. This lever has a rearward extension 41, a series of lower drill holes 42, a series of upper drill holes 43 and a central through slot 44. The lever is formed with a boss 45 having graduations 46. Lever extension 41 has an opening 47. An adjusting bolt 49 extends upwardly through opening 47. This bolt has a head 50 adjacent the under surface of extension 41 and carries a collar 50a that is positioned adjacent the upper surface of the extension. The arrangement of head 50 and collar 50a permits rotation of the bolt with respect to the extension but prevents accidental disengagement of the bolt from the extension. As is shown in Fig. 5, bolt 49 engages a tapped through opening 53 in a rearwardly projecting part 54 of a yoke 55 that includes a pair of spaced upstanding arms 56. A nut 51 prevents disengagement of the bolt from extension 54. A pivot shaft 60 extends through slot 44 and is supported at its ends by yoke arms 56.

A rod 61 is bifurcated at its forward end to obtain a pair of spaced arms 62. Each of these arms terminates in a pointer 63 (Fig. 5) that cooperates with graduations 46 to indicate the adjustment of the forward end of the rod. Rod 61 extends through central aperture 31 of end wall 30. As indicated in Figs. 2 and 5, shaft 60 extends through arms 62 of rod 61. The vertical position of the ends of arms 62 of the rod may be varied by adjusting bolt 49, as will be evident from an examination of Fig. 5.

Rod 61 is an element of a spring mechanism 65 that is best shown in Figs. 1 and 3 and that will now be described. This rod is threaded at its rearward end, as indicated at 66, and carries a nut 67 having a rounded forward surface 68. Coaxial with rod 61 is a guide tube 70 that bears at its forward end against end wall 30. Guide tube 70 carries a plurality of sliding sleeves, namely sleeves 71, 72, 73 and 74, that are formed with corresponding outer annular fillets 71', 72', 73' and 74', respectively. It will be observed that sleeve 71 is one-half the length of sleeves 72 and 73 and has only a single outer fillet. Sleeves 72 and 73 are preferably identical and each is provided with a pair of outer fillets. Sleeve 74 is provided with a single outer fillet and is of sufficient length to permit of necessary movement, during use, along guide tube 70.

The illustrated spring mechanism includes a plurality of spring units or assemblies 75. While three such units are shown in Fig. 1 to permit of desired axial movement of rod 61, it is to be understood that one or more units may be omitted depending on the requirements of a particular supporting device. Each spring unit 75 comprises a pair of oppositely disposed disc springs 76. Each disc spring is made of a suitable metal and is substantially uniform in thickness. Each disc spring is frusto-conical in configuration and defines a central through opening that is coaxial with guide tube 70. As shown, the portion of smallest diameter of each disc spring engages a corresponding sleeve fillet to minimize friction in operation.

Each spring unit 75 also comprises a means for maintaining the portions of greatest diameter of corresponding disc springs in axially aligned spaced relation. Such a means, as shown in Figs. 1 and 1a, may comprise a spacing ring 77 having inner annular fillets 78 which are engaged by the outer peripheral portions of the disc springs. The illustrated arrangement of guide tube 70, sleeves 71 to 74 inclusive, and spring units 75, permits the disc springs 76 of each spring unit to be flexed from the full line position to the dotted line position, shown in Fig. 8. The spring units having been initially precompressed to the start of the flat portion of the curve shown in Fig. 9, as represented by the full line position of disc springs 76 in Fig. 8, the disc springs may be further compressed along the flat portion of the curve to the dotted line position shown in Fig. 8. The relationship of Fig. 8 and the spring force diagram shown in Fig. 9 will be readily apparent to persons skilled in the art.

A backing plate 80 is welded to the rear end of sleeve 74 and has a central aperture 81 through which rod 61 extends. The rounded surface 68 of nut 67 bears against the portion of the backing plate that defines its central aperture. Plate 80 has a pair of oppositely disposed bosses 83 (Fig. 3) each of which carries a roller 84 that registers with and is movable along a corresponding guide 28 of the housing. This arrangement permits axial movement of sleeve 74 but prevents rotational movement of this sleeve relative to the housing.

A pair of spaced parallel plate levers 85 is mounted for pivotal movement about the coincident axes of shafts 86. As shown in Fig. 2, each shaft 86 is supported at its ends by a corresponding plate 32 and support arm 38. Plate levers 85 carry a shaft 87 that extends through an opening 43 in lever 40, as also shown in Fig. 2. The plate levers are maintained in the illustrated spaced relation to the lever by spacing sleeves 88.

A pin 90 is journaled in the forward ends of plate levers 85 and forms a pivotal connection with a load-carrying unit 91 that comprises a U-shaped yoke 92 having a pair of arms 93 and a web 94 that is centrally tapped, as indicated at 95. A threaded rod 96 extends through tap 95 and is provided with a pair of nuts 97 and 98. Unit 91 is adapted to be connected to a load such as an arrangement of pipes in a power plant or the like. Plate levers 85 carry coaxial indicating pins 99 that register with arcuate slots in support plates 32 and coact with corresponding scales 34 to indicate the position of the load in use.

As will be evident from an examination of Figs. 1 and 2, shafts 39, 60, 86 and 87 and pins 99 are all parallel to each other.

For the purpose of briefly outlining the operation of the apparatus shown in Figs. 1, 1a, 2, 3 and 5, it is assumed that the parts are assembled and are in the relative position shown in these views. With the parts so arranged, the disc springs are precompressed, by turning nut 67, to the start of the flat portion of the spring force diagram shown in Fig. 9 which corresponds to the graph shown in Fig. 15. Bolt 49 will have been turned so that pointer 63 aligns with the central part of scale 46 and pins 99 are at the extreme upper limit of travel in slots 33. Pins 99 serve the dual functions of limiting pivotal movement of plate levers 85 about the axis of shafts 86 and of indicating the extent of vertical travel of load-carrying unit 91. The apparatus is suspended from a supporting structure, such as an overhead beam, by means of connector bolts 25 and the load is then connected to load-carrying unit 91. The load may consist of a series of pipes that transmit a high temperature fluid.

The disc springs having been precompressed as stated above, the apparatus furnishes a substantially constant lifting support for the pipes while permitting the pipes to move upwardly or downwardly as a result of expansion or contraction due to variations in temperature of the material of the pipes. Downward movement of the load imparts corresponding counterclockwise pivotal movement of plate levers 85 about shafts 86 and substantially axial movement of rod 61. It will be evident that the arrangement illustrated permits of required slight pivotal movement of the rod during operation. Pins 99 permit movement of the plate levers within the range of constancy of the individual spring discs. The extent of load travel is dependent on the number of spring units 75 that are provided in the apparatus. Thus, if only slight load travel is expected, one or two spring units may be sufficient. If relatively extensive load travel is contemplated, additional spring units may be provided, together with a longer rod 61 than the one shown.

Any desired openings 42 and/or 43 (Fig. 5) may be selected in the arrangement for a particular apparatus to correspondingly vary the effective length of this lever and therefore the spring force. Thus, I am able to obtain a wide range of combinations of moments and travels with corresponding load-travel combinations. In other words, a single disc spring or a complete spring unit 75 is capable of yielding a number of load-travel combinations.

Fig. 4 illustrates a modification of the invention wherein the means for maintaining the disc springs of each spring unit in spaced relation is integral with each disc spring. In this modification, each disc spring 100 comprises a frusto-conical part 101 that corresponds to earlier described disc spring 76 and an annular flange 102 which terminates in an arcuate part 103 that is generally semi-circular in transverse cross section. The disc springs 100 are oppositely disposed and their arcuate parts 103 bear against and form substantially line contact with each other, thereby minimizing friction in use.

Reference is next had to Figs. 6 and 7 which illustrate a modification of the invention in which the various shafts, the plate levers and the load-carrying unit are positioned intermediate the ends of the housing. The housing in this modification is identified by numeral 105 and includes a tubular wall 106 that is provided with a preferably imperforate end wall 107 at its forward end. Secured to the inner face of end wall 107 is a ring 108 for supporting one end of a guide tube 109. At least the central portion of guide tube 109 is cut out, as shown in Fig. 7. Tubular wall 106 is cut out intermediate its ends to receive a pair of spaced parallel plates 110 that are welded in place and are provided with central apertures 111. A pair of bent plates 112 extends between plates 110 and either or both has a window 113. One of the plates 110 carries a pair of spaced parallel arms 114. Each of a pair of coaxial shafts 115 is supported at its ends by an arm 114 and a plate 112. These shafts correspond to earlier described shafts 86. Each of a pair of parallel plate levers 116 is mounted for pivotal movement about a corresponding shaft 115. The plate levers carry a combined travel stop and indicator 117 that registers with arcuate slots 118 in plates 112. Adjacent each slot 118 is an indicator scale 119 that may be the same as or similar to indicator scale 34 of Fig. 1.

A horizontal plate 120 (Fig. 7) is welded to plate levers 116 and carries an adjusting bolt 49 that threadedly engages a yoke 121 which is similar to yoke 55. Yoke 121 has an indicator 122 that coacts with a scale 123 on the plate levers. The yoke arms are provided with slots 124 to receive a shaft 125 that corresponds to shaft 60. This shaft, as shown in Fig. 7, is pivotally connected to plate levers 116 and an extension 126 of rod 61 and extends through the slots in the yoke arms. A tubular spacer 127 extends through apertures 111 and bears at its ends against sleeves 71. Thus, spacer 127 serves to transmit force exerted by spring units 75 at one end of the apparatus to spring units 75 at the other end of the apparatus, as will be evident from an examination of Fig. 6. Tubular spacer 127 is opened at the bottom to accommodate certain parts shown in Fig. 7 and is provided with a window 128 to permit access to such parts during assembly.

In Figs. 6 and 7, adjusting bolt 49 and yoke 121 are pivotal, as a unit, together with plate levers 116 about the coincident axes of shafts 115. The operation of this modification of the invention is substantially the same as that of the earlier described form of the invention.

Figs. 10 and 11 illustrate another modification of the invention wherein the parts are constructed and arranged so that rod 61 of the spring mechanism is disposed substantially vertically instead of horizontally. In this modification, a housing 135 includes a tubular wall 136, a top wall 137 and a bottom wall 138 having a central through aperture 139 (Fig. 11). A bar 140 extends diametrically across the upper surface of top wall 137. This bar is preferably welded to the top plate and is provided with a series of spaced drill holes 141. A means 142 for suspending the apparatus from an overhead beam or the like is pivotally connected to the housing by means of a bolt 143 which extends through a selected opening 141. Welded to and projecting below bottom wall 138 is a pair of spaced parallel plates 144 having windows 145 and arcuate slots 146. Adjacent each slot 146 is an indicator scale 147. Each slot 146 and scale 147 correspond to arcuate slot 33 and scale 34 of the form of the invention shown in Fig. 1.

A pair of spaced parallel plate levers 148 is provided with slots 149 and is pivotal about the axis of a shaft 150 that is supported at its ends by plates 144. Plate levers 148 carry a combined indicator and stop pin 151 that registers with slots 146. An indicator element 152 at each end of pin 151 coacts with scale 147 to indicate the extent of load travel. A bar 153 is welded to plate levers 148 and supports an adjusting bolt 49 and yoke 55. A pivot pin 154 extends through the yoke arms and the plate levers and is provided with an indicator 155 that coacts with an adjustment scale 156.

A yoke 157 corresponding to yoke 92, earlier described, has an opening 158 in its web to freely receive threaded rod 96. A retaining nut 159 is rounded at the bottom to permit of swivel movement of rod 96. The arms of yoke 157 are slotted, as indicated at 160, to receive portions of plate levers 148. These levers are pivotally connected to the yoke by coaxial shafts 161 which, as shown, are parallel to and in vertical alignment with connector bolt 143.

The construction shown in Figs. 10 and 11 operates in a manner similar to that shown in the earlier described embodiments of the invention.

Referring to Fig. 12, the same illustrates a modification of the invention wherein the load-carrying unit 91 is directly connected to the lower end of spring mechanism rod 61 through the medium of a yoke 163 and a pivot pin 164. In this modification, provision may be made to precompress the spring mechanism and limit vertical movement of the rod 61 to a distance equal to the sum of the permissible deflection range of the individual disc springs.

Figs. 13 and 14 illustrate a further embodiment of the invention wherein the apparatus is adapted to be positioned beneath and support an overhead load. In this modification, a housing 165 includes an upstanding tubular wall 166 having a bottom flange 167 which is provided with a plurality of drill holes 168 to receive bolts or screws for attaching the housing to a floor, foundation or other support. The housing has a top wall 169 having a central aperture 170 through which spring mechanism rod 61 projects.

Welded to and extending upwardly from the top wall is a pair of spaced parallel plates 171, each having a window 172 and an arcuate slot 173. Adjacent each slot 173 is a scale 174. Slots 173 and scale 174 respectively correspond to slot 33 and scale 34 of Fig. 1. A shaft 175 is supported at its ends by plates 171 and carries a pair of pivotal and parallel levers 176 that are also connected by a second shaft 177. Pivotal about shaft 177 is a yoke 178 that is adapted to be connected by a means (not shown) to an overhead load. The remaining parts of this embodiment of the invention are the same as or similar in construction to that shown in Fig. 10, the principal difference being that the parts are inverted.

From the foregoing, it is believed that the objects, construction, operation and advantages of my present invention will be readily comprehended by persons skilled in the art, without further description. Although the invention has been herein shown and described in several simple and practicable forms, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the following claims.

I claim:

1. In a constant load support device, a housing, a tubular member within and bearing against the housing, a spring unit within the housing and comprising a pair of disc springs mounted on the tubular member, each disc spring comprising a substantially frusto-conical resilient member that is substantially uniform in thickness and that includes a portion of largest diameter and a portion of smallest diameter defining a central through aperture, said resilient members being oppositely disposed with their largest diameters normally positioned intermediate their smallest diameters, said resilient members being coaxial with and movable along the tubular member, and spacing means positioned between and engaging the portions of largest diameter of the resilient members, and a rod at least partly in the tubular member and movable generally axially with respect thereto, said rod being connected to the spring unit and adapted to be connected to a load.

2. In a constant load support device, a housing, a tubular member within and bearing against the housing, a plurality of spring units mounted on and movable along the tubular member, each spring unit comprising a pair of disc springs, each disc spring comprising a substantially frusto-conical resilient member that is substantially uniform in thickness and that includes a portion of largest diameter and a portion of smallest diameter defining a central through aperture, the resilient members of each spring unit being oppositely disposed with their largest diameters normally positioned intermediate their smallest diameters, said resilient members being coaxial with the tubular member, first spacing means positioned between and engaging the portions of largest diameter of the resilient members of each spring unit, second spacing means comprising a sleeve coaxial with and movable along the tubular member, said second spacing means being positioned between and engaging the portion of smallest diameter of a resilient member of one spring unit and the corresponding portion of a resilient member of an adjacent spring unit, and a rod at least partly in the tubular member and movable generally axially with respect thereto, said rod being connected to one of the spring units and adapted to be connected to a load.

3. In a constant load support device, a housing, a tubular member within and bearing against the housing, a plurality of spring units mounted on and movable along the tubular member, each spring unit comprising a pair of disc springs, each disc spring comprising a substantially frusto-conical resilient member that is substantially uniform in thickness and that includes a portion of largest diameter and a portion of smallest diameter defining a central through aperture, the resilient members of each spring unit being oppositely disposed with their largest diameters normally positioned intermediate their smallest diameters, said resilient members being coaxial with the tubular member, first spacing means positioned between and engaging the portions of largest diameter of the resilient members of each spring unit, said first spacing means comprising a ring, second spacing means comprising a sleeve coaxial with and movable along the tubular member, said second spacing means being positioned between and engaging the portion of smallest diameter of a resilient member of one spring unit and the corresponding portion of a resilient member of an adjacent spring unit, and a rod at least partly in the tubular member and movable generally axially with respect thereto, said rod being connected to one of the spring units and adapted to be connected to a load.

4. In a constant load support device, a housing, a tubular member within and bearing against the housing, a plurality of spring units mounted on and movable along the tubular member, each spring unit comprising a pair of disc springs, each disc spring comprising a substantially frusto-conical resilient member that is substantially uniform in thickness and that includes a portion of largest diameter and a portion of smallest diameter defining a central through aperture, the resilient members of each spring unit being oppositely disposed with their largest diameters normally positioned intermediate their smallest diameters, said resilient members being coaxial with the tubular member, first spacing means positioned between and engaging the portions of largest diameter of the resilient members of each spring unit, said first spacing means comprising an annular member carried by each resilient member and terminating in a portion that is arcuate in transverse cross section, said portion of the annular member of each disc spring bearing against and forming substantially line contact with the corresponding portion of the other disc spring of the same spring unit, second spacing means comprising a sleeve coaxial with and movable along the tubular member, said second spacing means being positioned between and engaging the portion of smallest diameter of a resilient member of one spring unit and the corresponding portion of a resilient member of an adjacent spring unit, and a rod at least partly in the tubular member and movable generally axially with respect thereto, said rod being connected to one of the spring units and adapted to be connected to a load.

5. In a constant load support device, a housing including a generally horizontally disposed tubular wall and an end wall having an aperture formed therein, a spring unit within the housing and comprising at least one disc spring having a central through opening that is horizontally aligned with the aperture in the end wall, a rod extending through said aperture and said opening, means connecting one end of the rod to the spring unit, a lever connected to the housing and movable with respect thereto about a first pivotal axis, said lever being connected to the other end of the rod and movable with respect thereto about a second pivotal axis, said lever being adapted to be connected to a load and movable with respect thereto about a third pivotal axis, said pivotal axes being spaced apart and substantially parallel, and means for varying the distance between the first and second pivotal axes.

6. A device according to claim 5 wherein the spring unit comprises a pair of disc springs, each disc spring comprising a substantially frusto-conical resilient member including a portion of largest diameter and a portion of smallest diameter, said resilient members being oppositely disposed with their largest diameters normally positioned intermediate their smallest diameters, said resilient members being substantially coaxial, and spacing means positioned between and engaging the portions of largest diameter of the resilient members.

7. In a constant load support device, a housing including a generally horizontal tubular wall, a pair of spaced spring units within the housing, spacing means within the housing and bearing against both spring units, each spring unit comprising at least one disc spring having a central opening, the central openings of the disc springs being aligned substantially horizontally, a rod extending through the central opening of and connected at one end to one spring unit, a lever positioned intermediate the ends of the housing and the spring units and pivotal with respect to the housing about a first pivotal axis, said lever being connected to the other end of the rod and movable with respect thereto about a second pivotal axis, said lever being adapted to be connected to a load and movable with respect thereto about a third pivotal axis, said pivotal axes being spaced apart and substantially parallel, and means for varying the distance between the first and second pivotal axes.

8. A device according to claim 7 wherein each spring unit comprises a pair of disc springs, each disc spring comprising a substantially frusto-conical resilient member including a portion of largest diameter and a portion of smallest diameter, the resilient members of each spring unit being oppositely disposed with their largest diameters positioned intermediate their smallest diameters, and spacing means positioned between and engaging the portions of largest diameter of the resilient members of each spring unit.

9. In a constant load support device, a housing that is adapted to be suspended from an overhead support, said housing including an upstanding tubular wall and a bottom wall having an aperture formed therein, a spring unit within the housing and comprising at least one disc spring having a central through opening that is vertically aligned with the aperture in the bottom wall, a substantially vertically disposed rod extending through said opening and said aperture and projecting below the bottom wall, means connecting the upper end of the rod to the spring unit, a lever connected to the housing below the bottom wall and movable with respect thereto about a first pivotal axis, said lever being connected to the lower end of the rod and movable with respect thereto about a second pivotal axis, said lever being adapted to be connected to a load and movable with respect thereto about a third pivotal axis, said pivotal axes being spaced apart and substantially parallel, and means for varying the distance between the first and second pivotal axes.

10. A device according to claim 9 wherein the spring unit comprises a pair of disc springs, each disc spring comprising a substantially frusto-conical resilient member including a portion of largest diameter and a portion of smallest diameter, said resilient members being oppositely disposed with their largest diameters normally positioned intermediate their smallest diameters, said resilient members being substantially coaxial, and spacing means positioned between and engaging the portions of largest diameter of the resilient members.

11. In a constant load support device, a housing that is adapted to support a load which is at least partly positioned thereabove, said housing including an upstanding tubular wall and a top wall having an aperture formed therein, a spring unit within the housing and comprising at least one disc spring having a central through opening that is vertically aligned with the aperture in the top wall, a substantially vertically disposed rod extending through said opening and said aperture and projecting above the top wall, means connecting the lower end of the rod to the spring unit, a lever connected to the housing above the top wall and movable with respect thereto about a first pivotal axis, said lever being connected to the upper end of the rod and movable with respect thereto about a second pivotal axis, said lever being adapted to be connected to the load and movable with respect thereto about a third pivotal axis, said pivotal axes being spaced apart and substantially parallel, said first pivotal axis being located between the second and third pivotal axes, and means for varying the distance between the first and second pivotal axes.

12. A device according to claim 11 wherein the spring unit comprises a pair of disc springs, each disc spring comprising a substantially frusto-conical resilient member including a portion of largest diameter and a portion of smallest diameter, said resilient members being oppositely disposed with their largest diameters normally positioned intermediate their smallest diameters, said resilient members being substantially coaxial, and spacing means positioned between and engaging the portions of largest diameter of the resilient members.

13. In a constant load support device, a housing that is adapted to be suspended from an overhead support, said housing including an upstanding tubular wall and a bottom wall having an aperture formed therein, a spring unit within the housing and comprising a pair of disc springs, each disc spring comprising a substantially frusto-conical resilient member having a central through opening that is vertically aligned with the aperture in the bottom wall, each resilient member including a portion of largest diameter and a portion of smallest diameter, said resilient members being oppositely disposed with their largest diameters normally positioned intermediate their smallest diameters, said resilient members being substantially coaxial, spacing means positioned between and engaging the portions of largest diameter of the resilient members, a substantially vertically disposed rod extending through said opening and said aperture and projecting below the bottom wall, means connecting the upper end of the rod to the spring unit, and means for connecting the lower end of the rod to a load.

14. In a spring device, a substantially frusto-conical resilient member having a central through opening, said resilient member being substantially uniform in thickness and including a portion of smallest diameter and a portion of largest diameter, and an annular member which is an extension of the portion of largest diameter of the resilient member and which projects beyond the end of the resilient member that is remote from the portion of smallest diameter, said annular member being integral and coaxial with the resilient member and including a part which is arcuate in transverse cross-section and an annular flange intermediate said arcuate part and the portion of largest diameter of the resilient member.

15. In a spring device, a substantially frusto-conical resilient member having a central through opening, said resilient member being substantially uniform in thickness and including a portion of smallest diameter and a portion of largest diameter, and an annular member which is an extension of the portion of largest diameter of the resilient member and which projects beyond the end of the resilient member that is remote from the portion of smallest diameter, said annular member being integral and coaxial with the resilient member and being arcuate in transverse cross-section.

References Cited in the file of this patent

UNITED STATES PATENTS

| | | |
|---|---|---|
| 1,826,597 | Brecht | Oct. 6, 1931 |
| 2,208,064 | Wood | July 16, 1940 |
| 2,308,475 | Fawkes | Jan. 12, 1943 |
| 2,420,276 | Wood | May 6, 1947 |
| 2,618,449 | Kohler | Nov. 18, 1952 |
| 2,656,997 | Holmen | Oct. 27, 1953 |
| 2,708,110 | Clay | May 10, 1955 |

FOREIGN PATENTS

| | | |
|---|---|---|
| 500,476 | Germany | June 21, 1930 |
| 612,082 | Germany | Apr. 13, 1935 |
| 824,126 | Germany | Dec. 10, 1951 |